2,767,155
CORTICAL HORMONES

Eugene P. Oliveto, Bloomfield, and Emanuel B. Hershberg, West Orange, N. J., assignors to Schering Corporation, Bloomfield, N. J., a corporation of New Jersey No Drawing. Application November 18, 1954, Serial No. 469,844

1 Claim. (Cl. 260—397.1)

This invention relates to new compounds useful as intermediates in the preparation of corticosterone and related hormones and to methods of preparing the new compounds. The invention is particularly directed to 3-keto-11β-hydroxyetiocholanic acid of the formula

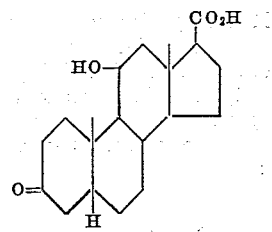

and its Δ⁴ and Δ¹,⁴ unsaturated analogs.

No instance is recorded in the literature of the preparation of corticosterone via an etio-acid. Fieser and Fieser, in "Natural Products Related to Phenanthrene" at page 444, say, "The diazoketone synthesis cannot be employed for the synthesis of corticosterone because the 11β-hydroxyl group is eliminated under the conditions required for preparation of the acid chloride and cannot be acylated for protection." However, we have now found conditions which permit the formation of an acid chloride from an etio acid without the simultaneous destruction of an unprotected 11β-hydroxy group.

More particularly, we have found that treatment of metal salts 3-keto-11β-hydroxyetiocholanic acid and the corresponding Δ¹-cholenic and Δ¹,⁴-choladienic acids with oxalyl chloride, preferably at temperatures below about 50° C., results in the production in good yield of the corresponding acid chlorides without affecting the β-hydroxy group. The reaction may be carried out in an inert organic liquid medium, such as benzene or ether, or the acid salt may be treated directly with the oxalyl chloride.

Making use of this discovery, we have developed a new method for the synthesis of the important adrenal hormone corticosterone, a method which is simpler and which proceeds in better yield than previous methods. The reaction scheme is outlined below:

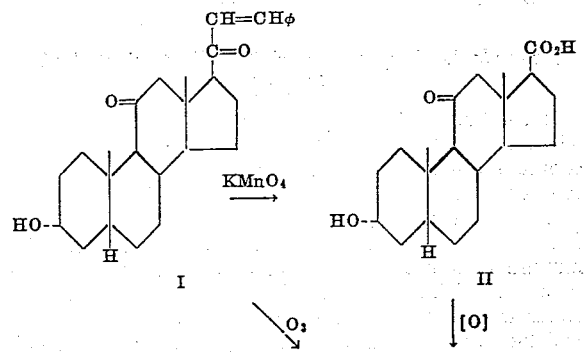

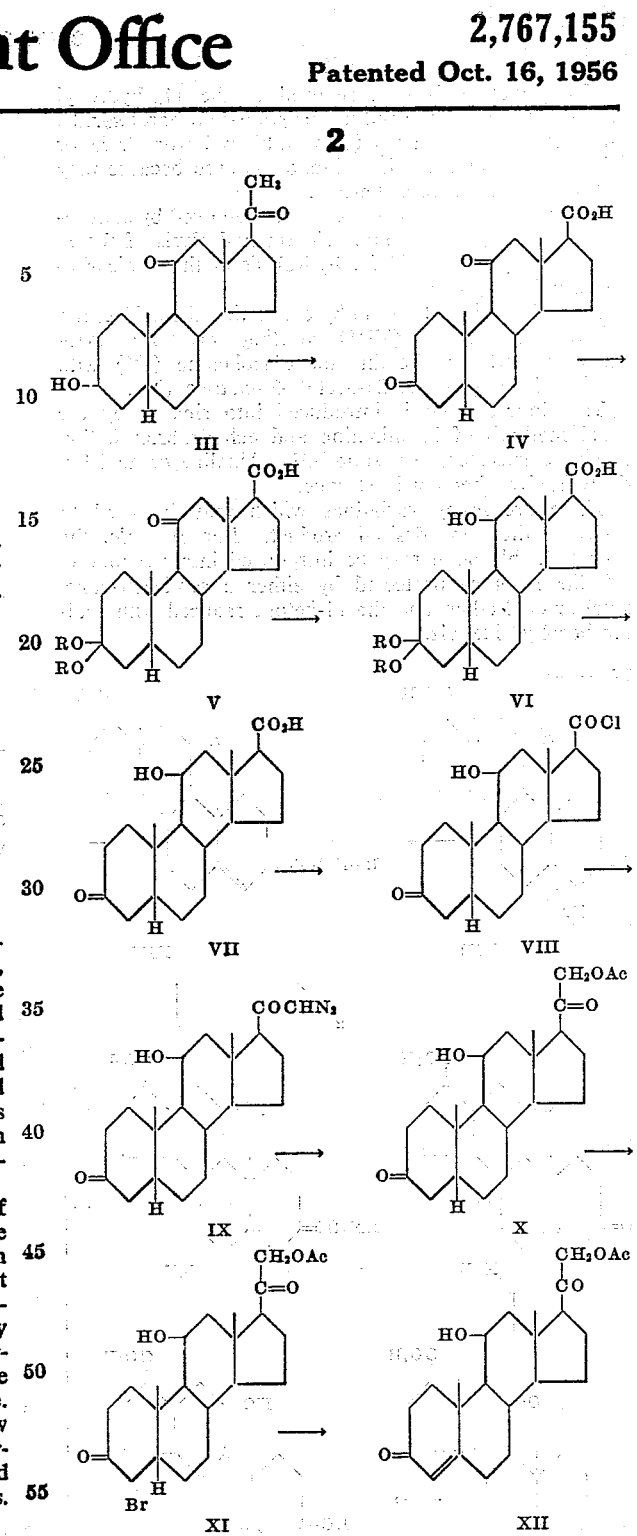

The 3,11-diketoetiocholanic acid (IV) can be prepared in a number of ways:

(a) Oxidation of pregnan-3α-ol-11,20-dione (III) with alkaline hypohalite solution.

(b) Ozonization of 21-benzylidenepregnan-3α-ol-11,20-dione (I), which removes the side-chain and oxidizes the 3-hydroxyl to a ketone.

(c) KMnO₄ oxidation of I, which yields 3α-hydroxy-11-ketoetiocholanic acid (II). Mild oxidation of II then gives IV.

The 3-ketone group of IV must then be protected so that the 11-ketone can be selectively reduced. This can be done by any number of conventional procedures, e. g. formation of the dimethyl ketal, ethylene glycol ketal, semicarbazone, oxime, etc.

The 11-ketone is then reduced to the 11β-hydroxyl group, preferably with sodium or potassium borohydride. Stronger reducing agents (e. g. lithium borohydride or lithium aluminum hydride) cannot be used because they would attack the carboxyl group.

The protective group at C–3 is then removed by conventional methods, e. g. dilute acid for hydrolysis of the 3-ketals, and pyruvic acid for hydrolysis of the semicarbazones and oximes.

The side-chain is built up by converting the acid group to an acid chloride (VIII) reacting this with diazomethane, and then heating the diazoketone (IX) with acetic acid to give the 21-acetate-20-ketone (X).

The double bond is introduced into ring A by the usual methods of bromination and dehydrobromination to give corticosterone acetate XII. Alkaline or acid hydrolysis gives free corticosterone.

There are many variations which may be used to arrive at the same desired product. For example, the A-ring double bond may be introduced into Compound IV, the 3-ketone protected by either a semicarbazone, ketal or enol ether, and the 11-ketone reduced with sodium borohydride, viz.

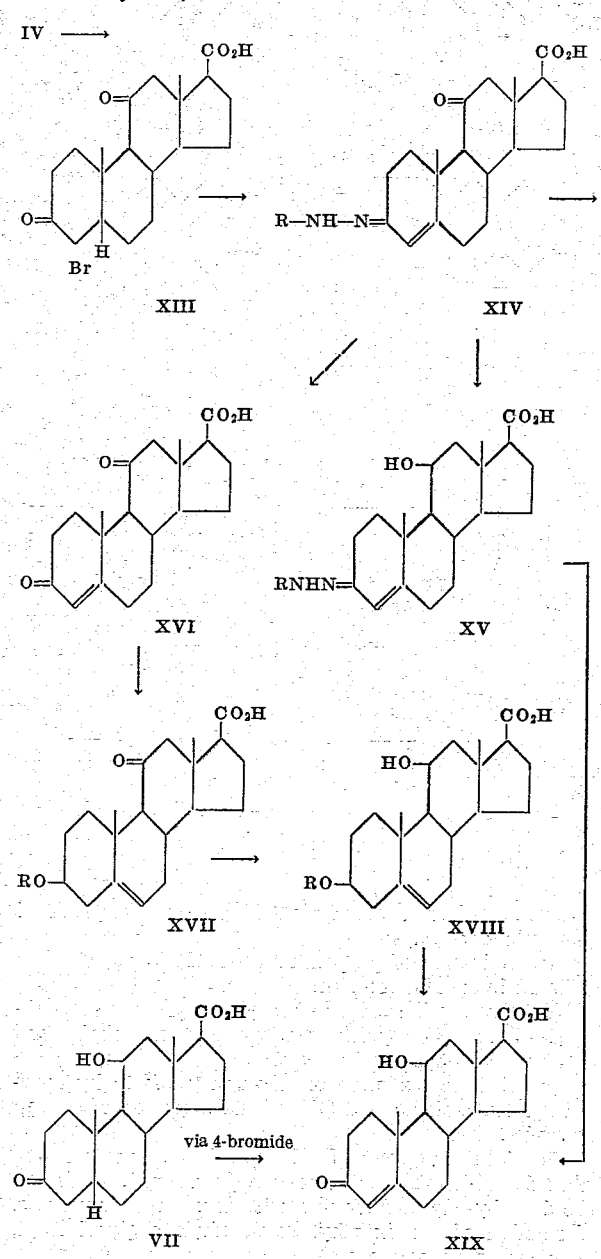

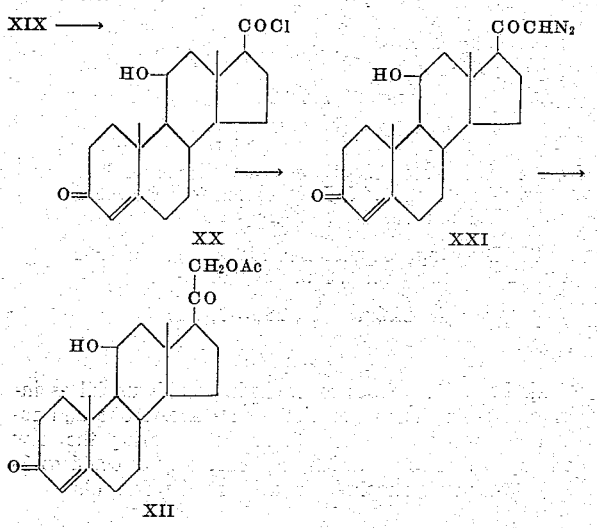

Compound XIX may also be prepared by the introduction of a double bond into Compound VII.

Making use of this new method, it is possible to prepare $\Delta^{1,4}$-pregnadien-11β,21-diol-3,20-dione (XXVII), a new steroid, which possesses even greater cortical hormonal properties than corticosterone. The reaction scheme is outlined below:

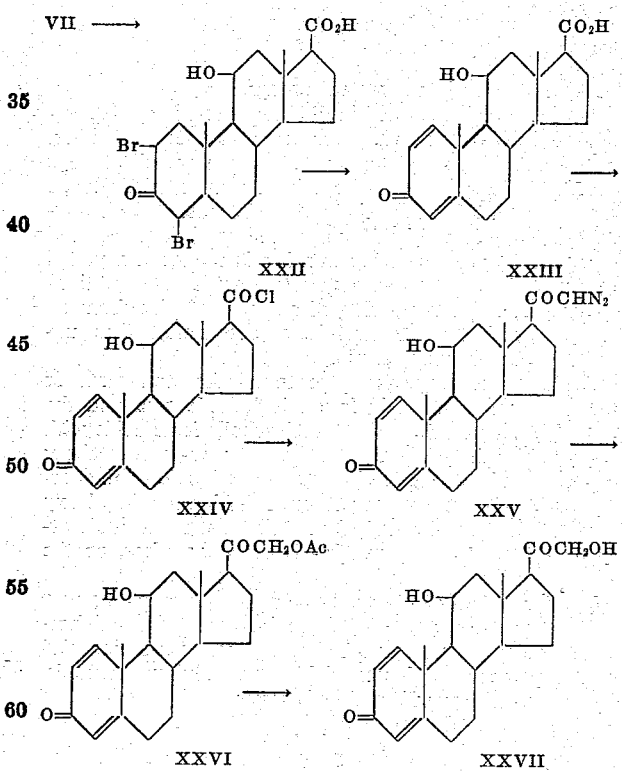

*Example 1.—Preparation of 3,11-diketoetiocholanic acid (IV)*

A solution of 1.00 g. of 21-benzyliden-pregnan-3α-ol-11,20-dione (I) in 150 ml. of C. P. ethyl acetate is ozonized at —70° C. On the appearance of a permanent blue color the ozone formation is stopped and the system flushed with oxygen ten minutes longer. After treating with 2 g. of zinc dust and 5 ml. of acetic acid, the mixture is allowed to stand at room temperature overnight, at which time a starch-iodide test is negative. The solids are removed by filtration, washed with ethyl acetate and the filtrate steam distilled to give 0.56 g. of a solid. The product, crystallized twice from acetone-hexane, melts at 254°–259° C. d., [α]$_D$ +89.2° C. (chlor.). The infrared spectrum shows no free hydroxyl group.

*Example II.—Preparation of 3,11-diketoetiocholanic acid (IV)*

To a solution of 1.00 g. of I in 35 ml. of 85% aqueous acetone at 40° C. is added instantly a solution of 1.0 g. of potassium permanganate in 60 ml. of 85% aqueous acetone. The mixture is stirred 15 hours at room temperature, filtered, the filtrate heated to its boiling point, and the product II crystallized by the addition of dilute hydrochloric acid: yield 0.50 g., M. P. 268–276° C. d.

Oxidation of II with either chromic acid, N-bromosuccinimide or N-bromoacetamide gives IV.

*Example III.—Preparation of 3,11-diketoetiocholanic acid 3-ethylene ketal (V)*

A mixture of 1.00 g. of IV, 10 ml. of ethylene glycol, 10 ml. of methylene chloride and 1.00 g. of selenium dioxide is stirred overnight at 25° C. A solution of 2 g. of potassium carbonate in 15 ml. of water is added rapidly, giving a pH of ca. 9. Acetic acid is then added dropwise until a pH of about 5 is reached. The layers are separated and the water layer extracted three times with methylene chloride. The combined organic extracts are washed with water, dried and evaporated to give 1.26 g. of 3,11-diketoetiocholanic acid 3-ethylene ketal (V), M. P. 234–238° C. One recrystallization from ether-hexane gives 0.91 g., M. P. 238–241° C., [α]$_D$ +70.2° C. (chlor.).

*Example IV.—Preparation of 3-keto-11β-hydroxyetiocholanic acid (VII)*

A mixture of 0.60 g. of 3,11-diketoetiocholanic acid 3-ethylene ketal V, 0.20 g. of sodium hydroxide, 30 ml. of C. P. methanol, 0.60 g. of sodium borohydride and 6 ml. of water is refluxed overnight. The methanol is removed under reduced pressure, the clear residue diluted with water, acidified with acetic acid and filtered to give 0.54 g. of 3-keto-11β-hydroxyetiocholanic acid 3-ethylene ketal VI, M. P. 160–165° C. This is dissolved in 10 ml. of acetic acid and 10 ml. of water, heated 30 minutes on the steam bath, water added and the mixture chilled and filtered to give 0.44 g. of VII, M. P. 252–259° C. Recrystallization from aqueous acetone gives 0.38 g. of VII, M. P. 258–261° C., [α]$_D$ +80.8° C. (ethanol).

*Example V.—Preparation of 3-keto-11β-hydroxy-Δ$^4$-etiocholanic acid (XIX)*

A solution of 3.18 g. of VII in 20 ml. of acetic acid is brominated at room temperature by the dropwise addition of 1.60 g. bromine in 15 ml. of acetic acid. When the bromine color has completely discharged, water is added, and the precipitated 4-bromo-3-keto-11β-hydroxyetiocholanic acid is removed by filtration.

A solution of 4.0 g. of the 4-bromide in 40 ml. of acetic acid is treated with 2 g. of semicarbazide base at 0° C. for 4 hours.

The solvent is removed under reduced pressure, water is added, and the 3-semicarbazone of XIX removed by filtration.

The semicarbazone (3.0 g.) is dissolved in 50 ml. of acetic acid and refluxed 20 minutes with an equal weight of pyruvic acid. Removal of the solvent under reduced pressure, followed by addition of water gives XIX, M. P. 250° C.

*Example VI.—Preparation of 3-keto-11β-hydroxy-Δ$^{1,4}$-etiocholadienic acid (XXIII)*

A solution of 3.18 g. of VII in 20 ml. of acetic acid is brominated at rom temperature by the dropwise addition of 3.20 g. of bromine in 40 ml. of acetic acid. After the bromine color has been discharged, addition of water precipitates 2,4-dibromo-3-keto-11β-hydroxyetiocholanic acid XXII. To 50 ml. of refluxing collidine is added 1.0 g. of the dibromide, and the heating continued one hour.

Chloroform and water are added, the organic layer washed several times with 10% sulfuric acid, and then with water until neutral. The organic layer is dried and evaporated, and the solid residue chromatographed on silica gel to give pure XXIII, M. P. 265° C.

*Example VII.—Preparation of dihydrocorticosterone acetate (X)*

A solution of 603 mg. of sodium hydroxide in 50 ml. of water is used to dissolve 5.02 g. of VII, with the aid of gentle heating. The clear solution is then evaporated to dryness and the residue dried in vacuo for 14 hours to give the sodium salt of VII.

To the salt is added 50 ml. of benzene, the slurry cooled to −10° C., and a solution of 15 ml. of distilled oxalyl chloride in 35 ml. of benzene is added dropwise and with rapid stirring. The mixture is allowed to warm to room temperature, and stirred 30 minutes longer. The solvent is removed under reduced pressure, the residue flushed with 10 ml. of benzene, then dried in vacuo for 30 minutes to give crude 3-keto-11β-hydroxyetiocholanyl chloride VIII. This is dissolved in 50 ml. of dry methylene chloride and the inorganic residue removed by filtration. The filtrate is cooled to −10° C. and then reacted at this temperature with excess diazomethane (prepared in methylene chloride and dried over sodium hydroxide pellets). The resulting yellow solution is evaporated to dryness in vacuo yielding the light yellow colored diazoketone IX. This is dissolved in 35 ml. of acetic acid and refluxed 10 minutes. Water is added to give a gummy product, which is first dissolved in acetone, the solution taken to dryness and then sludged with ether to give 1.47 g. of X, M. P. 150–160° C. Two other fractions, 0.28 g., M. P. 148–150° C. and 0.37 g., M. P. 150–152° C., may be obtained giving a total of 2.12 g. This is crystallized from ether to give 1.87 g. of X, M. P. 154–157° C.

*Example VIII.—Corticosterone acetate*

A solution of 1.0 g. of X in 10 ml. of acetic acid is brominated at 20° with 1 molar equivalent of bromine in 5 ml. of acetic acid. The 4-bromide XI is isolated by the addition of water. Without purification this is dehydrohalogenated by the usual semicarbazone procedure to yield corticosterone acetate (XII).

*Example IX.—3-keto-11-β-hydroxy-Δ$^4$-etiocholanic acid XIX*

The diketo-acid IV is brominated and dehydrobrominated as described in Example VI to give 3,11-diketo-Δ$^4$-etiocholanic acid XVI. This is converted to the 3-ethylene ketal XVII by means of ethylene glycol, benzene and p-toluene sulfonic acid. The ketal is reduced with sodium borohydride in the usual manner, and the ketal group removed by dilute acid to give 3-keto-11β-hydroxy-Δ$^4$-etiocholanic acid XIV.

*Example X.—3-keto-11β-hydroxy-Δ$^4$-etiocholanic acid*

The 4-bromide XIII was treated with semicarbazide to give the semicarbazone XIV. This was reduced with sodium borohydride in the usual manner to give XV. Removal of the semicarbazone group with pyruvic acid gives XIX.

*Example XI.—Corticosterone acetate*

Treatment of 1.0 g. of XIX in the form of its sodium salt with oxalyl chloride as described in Example VII gives 3-keto-11β-hydroxy-Δ$^4$-cholenyl chloride (XX). The chloride is reacted with diazomethane as described in Example VII to give the diazoketone XXI which melts with decomposition. Treatment of the diazoketone with acetic and by the method of Example VII gives corticosterone acetate (XII) in 60% yield.

*Example XII.—Δ$^{1,4}$-pregnadien-11β,21-diol-3,20-dione 21-acetate XXVI*

Treatment of 2.0 g. of 3-keto-11β-hydroxy-Δ$^{1,4}$-etiocholadienic acid XXIII in the form of its sodium salt with oxalyl chloride by the method described in Example VII give 3-keto-11β-hydroxy-Δ$^{1,4}$-etiocholadienyl chloride XXIV. The chloride is reacted with diazomethane as described in Example VII to give the diazoketone XXV and treatment of the diazoketone with acetic acid by the method of Example VII gives XXVI in 55% yield, M. P. 210° C.

*Example XIII.—Δ$^{1,4}$-pregnadien-11β,21-diol-3,20-dione XXVII*

A mixture of 1.0 g. of XXVI, 20 ml. of methanol, 0.5 g. of potassium bicarbonate and 5 ml. of water is refluxed 15 minutes under a nitrogen atmosphere. Acetic acid is then added to pH 6, the methanol is removed under reduced pressure, and water is added to precipitate Δ$^{1,4}$-pregnadien-11β,21-diol-20-one (XXVII), M. P. 190° C.

*Example XIV.—3-keto-11β,-hydroxyetiocholanyl chloride VIII*

A mixture of 1 g. of the sodium salt of VII (prepared as in Example VII) and 15 ml. of distilled oxalyl chloride is shaken at 0° C. for 5 hours. During this time the steroid gradually goes into solution. The excess solvent is removed under reduced pressure and the residue dried in vacuo to give crude VII.

*Example XV.—3-keto-11β-hydroxy-Δ$^4$-cholenyl chloride XX*

A slurry of 1 g. of the sodium salt of XIX with 50 ml. of ether is treated at 25° with 5 ml. of distilled oxalyl chloride. The mixture is allowed to react at room temperature for 2 hours. The solvent is removed under reduced pressure and the crude acid chloride XX dried in vacuo.

We claim:

3-keto-11β-hydroxy-Δ$^{1,4}$-etiocholadienic acid.

References Cited in the file of this patent

UNITED STATES PATENTS

| | | |
|---|---|---|
| 2,447,325 | Gallagher | Aug. 17, 1948 |
| 2,538,611 | Wilds | Jan. 16, 1951 |